United States Patent
Arumugam et al.

(10) Patent No.: US 9,714,359 B2
(45) Date of Patent: Jul. 25, 2017

(54) REMEDIATION OF YELLOWING IN A COATINGS FORMULATION CONTAINING A SORBATE ESTER OR A SORBAMIDE COALESCENT

(71) Applicant: Rohm and Haas Company, Philadelphia, PA (US)

(72) Inventors: Selvanathan Arumugam, Blue Bell, PA (US); John Ell, Quakertown, PA (US); Ralph C. Even, Blue Bell, PA (US); Brandon Rowe, Robbinsville, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 25 days.

(21) Appl. No.: 14/732,925

(22) Filed: Jun. 8, 2015

(65) Prior Publication Data

US 2015/0361290 A1    Dec. 17, 2015

Related U.S. Application Data

(60) Provisional application No. 62/012,546, filed on Jun. 16, 2014.

(51) Int. Cl.
| | |
|---|---|
| *C08K 5/00* | (2006.01) |
| *C09D 133/06* | (2006.01) |
| *C08K 3/00* | (2006.01) |
| *C09D 7/12* | (2006.01) |
| *C08K 5/101* | (2006.01) |
| *C08K 5/20* | (2006.01) |

(52) U.S. Cl.
CPC .......... *C09D 133/06* (2013.01); *C08K 3/0008* (2013.01); *C08K 5/005* (2013.01); *C08K 5/0008* (2013.01); *C08K 5/101* (2013.01); *C08K 5/20* (2013.01); *C09D 7/1241* (2013.01)

(58) Field of Classification Search
CPC ............................ C08K 5/0016; C08K 5/0008
See application file for complete search history.

(56) References Cited

U.S. PATENT DOCUMENTS

| | | | |
|---|---|---|---|
| 5,484,849 A | 1/1996 | Bors et al. | |
| 5,663,213 A * | 9/1997 | Jones | A61K 8/72 424/419 |
| 2007/0021571 A1* | 1/2007 | Kamata | C08F 8/14 525/386 |
| 2013/0052431 A1* | 2/2013 | Enomoto | C09D 133/16 428/195.1 |

FOREIGN PATENT DOCUMENTS

| | | | |
|---|---|---|---|
| JP | 2001181348 A | * | 7/2001 |
| WO | 2007/094922 A2 | | 8/2007 |

OTHER PUBLICATIONS

English machine translation of Sato et al. (JP 2001-181348); translated Jul. 6, 2016.*

* cited by examiner

*Primary Examiner* — Michael Pepitone
(74) *Attorney, Agent, or Firm* — Reid S. Willis

(57) ABSTRACT

The present invention is a composition comprising a stable aqueous dispersion of polymer particles and a sorbate ester, which is a liquid at 20° C. and has a molecular weight in the range of 125 to 500 g/mol. The composition of the present invention provides a way to enhance film formation of coatings prepared using relatively high $T_g$ latexes without the aid of high volatile organic content (VOC) coalescents.

10 Claims, No Drawings

REMEDIATION OF YELLOWING IN A COATINGS FORMULATION CONTAINING A SORBATE ESTER OR A SORBAMIDE COALESCENT

The present invention relates to a composition comprising a stable aqueous dispersion of polymer particles (that is, a latex), and a sorbate ester or sorbamide coalescent, and a radical mediator to reduce color bodies in the composition.

Recent environmental regulations around the globe are driving the need in the architectural coatings market for materials with very low or no odor and low volatile organic chemicals (VOCs). Balancing VOCs against desired paint performance attributes is a continuing challenge.

Paint formulations comprise either a low $T_g$ polymer latex that forms film with little or no coalescent, or a high $T_g$ latex that forms film with the aid of a coalescent. Formulations containing low $T_g$ polymers generally give coatings having a soft and tacky feel and poor durability. Formulations using high-$T_g$ polymers, on the other hand, require either permanent (nonvolatile) coalescents or volatile coalescents; permanent coalescents are known to adversely affect the hardness performance of the consequent coating; volatile coalescents such as Texanol, on the other hand, may give acceptable hardness performance—for example, a Koenig hardness of ~20 s at 28 days for a typical semigloss paint—but are undesirable for their volatility.

Both low temperature film formation and film hardness can be achieved by using a reactive coalescent. For example, WO 2007/094922 describes the use of a bis-allylic unsaturated fatty acid ester as a reactive coalescent. Unfortunately, the described coalescent does not yield the desired hardness performance properties for the consequent coating.

Accordingly, it would be advantageous to find a non-volatile or substantially non-volatile coalescent for paint formulations that addresses the aforementioned needs.

SUMMARY OF THE INVENTION

The present invention addresses a need in the art by providing a composition comprising a stable aqueous dispersion of polymer particles, from 0.5 to 35 weight percent of a sorbate ester or sorbamide coalescent, based on the weight of the polymer particles, and from 10 ppm to 1 weight percent of a radical mediator, based on the weight of the composition, wherein the coalescent is imbibed in the polymer particles, and wherein radical mediator is a hindered amine, a hindered N-oxide, a thiol, an amino polycarboxylic acid or a salt thereof, a polyphosphate, or a phenol, or a combination thereof. The composition of the present invention provides a way to enhance film formation of coatings at or even below room temperature, prepared using relatively high $T_g$ latexes without the aid of high volatile organic content (VOC) coalescents. The composition also exhibits a reduction of undesirable color bodies.

DETAILED DESCRIPTION OF THE INVENTION

The present invention is a composition comprising a composition comprising a stable aqueous dispersion of polymer particles, from 0.5 to 35 weight percent of a sorbate ester or sorbamide coalescent, based on the weight of the polymer particles, and from 10 ppm to 1 weight percent of a radical mediator, based on the weight of the composition wherein the coalescent is imbibed in the polymer particles, and wherein radical mediator is a hindered amine, a hindered N-oxide, a thiol, an amino polycarboxylic acid or a salt thereof, a polyphosphate, or a phenol, or a combination thereof.

The coalescent is preferably a liquid at 20° C. and preferably characterized by the following formula:

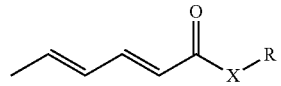

where R is a $C_1$-$C_{20}$ linear or branched alkyl group optionally functionalized with an ether, thioether, amine, hydroxyl, ester, phenyl, alkyenyl groups, or combinations thereof; and C(O)X is an ester group or an amide group.

Preferably, R is —(CH$_2$—CH(R$^1$)—O)$_n$—R$^2$, —CH(R$^1$)—CH$_2$—O—R$^2$, or linear or branched —R$^3$—OR$^2$;

where R$^1$ is H, C$_1$-C$_6$-alkyl, —CH$_2$OH, or phenyl;

R$^2$ is H, C$_1$-C$_6$-alkyl, benzyl, or CH$_3$CH=CH—CH=CH—C(O)—; allyl; —C(O)—CR$^4$=CH$_2$;

R$^3$ is a bivalent C$_4$-C$_{10}$-linear or branched alkyl or hydroxyalkyl group;

R$^4$ is H or CH$_3$;

and n is 1 to 7.

The coalescent preferably has a molecular weight in the range of 126 g/mol to 2000 g/mol, more preferably to 1000 g/mol, and most preferably to 500 g/mol. It is possible that the coalescent includes more than one sorbate ester or amide groups, or combinations thereof. A preferred coalescent is a sorbate ester wherein the ester portion (the R group) is functionalized with a hydroxyl group.

The coalescent of the composition of the present invention can be prepared in a variety of ways such as those set forth in the following schemes where R is as previously defined and Y is OH or Cl:

Scheme 1

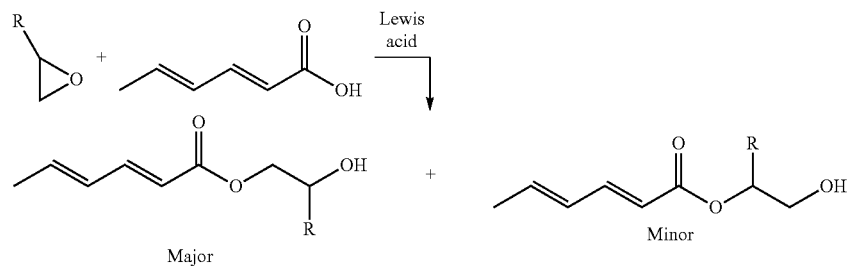

Scheme 2

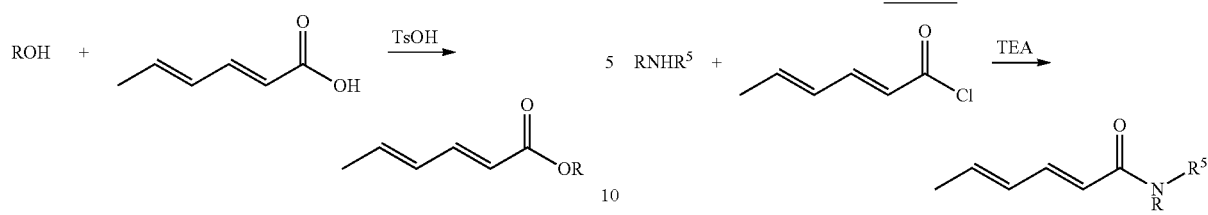

Scheme 3

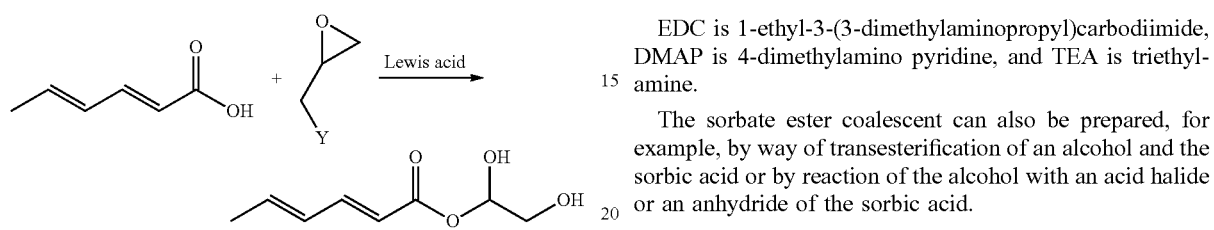

Scheme 4

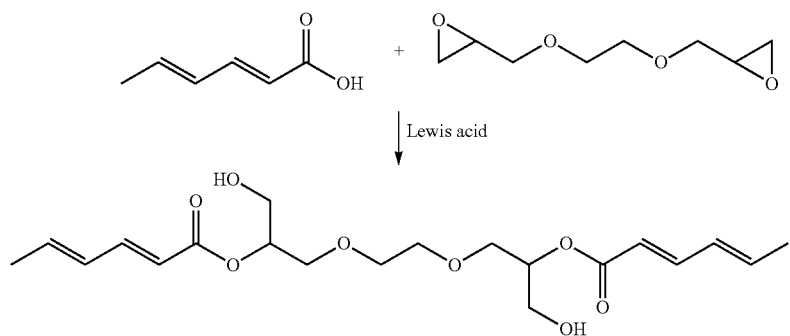

Scheme 5

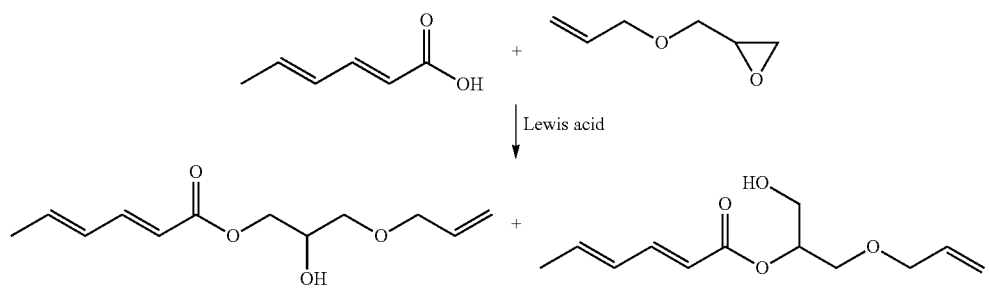

Scheme 6

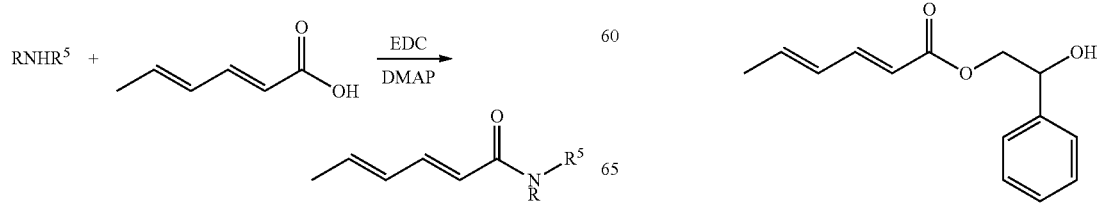

Scheme 7

$RNHR^5$ + <span style="display:inline">(sorbic acid chloride)</span> →<sup>TEA</sup> (sorbamide product)

EDC is 1-ethyl-3-(3-dimethylaminopropyl)carbodiimide, DMAP is 4-dimethylamino pyridine, and TEA is triethylamine.

The sorbate ester coalescent can also be prepared, for example, by way of transesterification of an alcohol and the sorbic acid or by reaction of the alcohol with an acid halide or an anhydride of the sorbic acid.

Examples of suitable sorbate ester and sorbamide coalescents include:

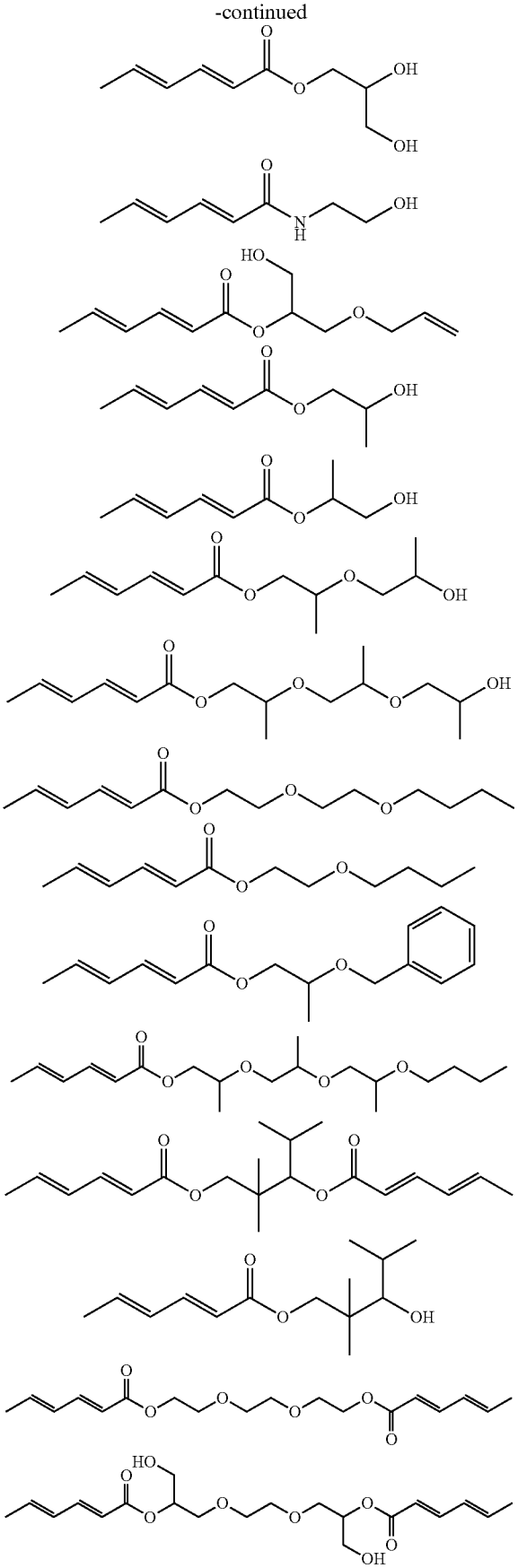

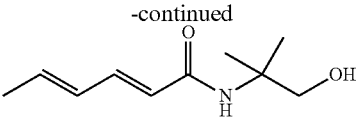

As used herein, the word "imbibed" means that at least 60% of the coalescent in the composition is incorporated into the polymer particles, that is, less than 40% of the coalescent is present in the aqueous phase of the latex. Preferably, at least 90%, more preferably at least 95, and most preferably at least 98% of the coalescent is imbibed into the polymer particles. The extent of imbibing can be determined by proton NMR spectroscopy, as discussed in the section of this text titled "Determination of Imbibing of Coalescent into the Latex Particle."

The coalescent preferably has a boiling point at atmospheric pressure of greater than 250° C.; as such, the preferred embodiment of the present invention promotes hardening of a coating prepared from the composition without the use of volatile coalescents. The coalescent gives surprisingly useful low temperature film formation (LTFF) properties in the formulated paint, that is, it provides excellent mechanical strength for films that are formed at 4° C.

The coalescent is preferably used at a concentration in the range of from 1 to 20, more preferably to 12 weight percent, based on the weight of the polymer particles and the coalescent. Preferably, the coalescent is a sorbate ester.

Examples of suitable stable aqueous dispersions of polymer particles (also known as latexes) include acrylic, styrene-acrylic, vinyl ester-acrylic, polyurethane, alkyd, and vinyl-ester polyethylene latexes. The solids content of the latex is preferably in the range of 30 to 60%, and the $T_g$ of the polymer particles is preferably in the range of from 0° C., more preferably from 20° C., to 100° C., more preferably to 60° C.

The composition further includes a radical mediator at a concentration of from 10 ppm, preferably from 20 ppm, and more preferably from 50 ppm, to 1 weight percent, preferably to 0.5 weight percent, and most preferably to 0.1 weight percent, based on the weight of the composition. The radical mediator may be a hindered amine, a hindered N-oxide, a thiol, an amino polycarboxylic acid or salts thereof, a polyphosphate, or a phenol, or a combination thereof. As used herein, a hindered amine is a protonated secondary amine attached to two tertiary or quaternary saturated carbon atoms, as illustrated:

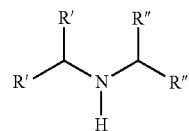

Wherein R' and R" are each independently H or a $C_1$-$C_{12}$-alkyl group with the proviso that at least one of the R' groups and one of the R" groups is a $C_1$-$C_{12}$-alkyl group optionally functionalized with a hydroxyl group or an ether group, or one of the R' groups and one of the R" groups together with the carbon atoms to which they are attached form a piperidine ring or a pyrrolidine ring, either unsubstituted or substituted with a hydroxyl group or an ether group. Examples of suitable hindered amine radical mediators include 2,6-dimethyl piperidine and 2,2,6,6-tetramethyl piperidine.

Similarly, a hindered N-oxide can be characterized by the following formula:

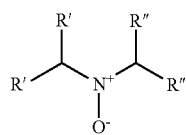

Examples of suitable hindered N-oxides include 2,2,6,6-tetramethylpiperidine-1-oxyl (TEMPO), 4-acetamido-2,2,6,6-tetramethylpiperidine-1-oxyl (4-acetamido TEMPO), and 4-hydroxy-2,2,6,6-tetramethylpiperidine-1-oxyl (4-hydroxy TEMPO). Examples of suitable thiols include 1,3-propanedithiol, 1,4-butanedithiol, 1,5-pentanedithiol, 1,6-hexanedithiol, 1,10-decanedithiol, 2,3-dimercapto-1-propanol, ethylene glycol bis(mercaptoacetate), 1,4-butanediol bis(mercaptoacetate), trimethylolpropane tris(mercaptoacetate), pentaerythritoltetrakis(mercaptoacetate), pentaerythritol tetrakis(3-mercaptoproprionate) (PETMP), ethylene glycol bis(3-mercaptopropionate), 1,4-butanediol bis(3-mercaptopropionate), tetraethylene glycol bis(3-mercaptopropionate), trimethylolpropane tris(3-mercaptopropionate), dipentaerythritol hexakis(3-mercaptopropionate), 1,2-benzenedithiol, 1,2-benzenedimethanethiol, 1,3-benzenedimethanethiol, 1,4-benzenedimethanethiol, 2,4-bis(mercaptomethyl)-1,3,5-trimethylbenzene, trithiocyanuric acid, 6-(dibutylamino)-1,3,5-triazine-2,4-dithiol, 6-(dibutylamino)-1,3,5-triazine-2,4-dithiol, tris[2-(3-mercaptopropionyloxy)ethyl]isocyanurate Examples of suitable aminopolycarboxylic acids and salts thereof include ethylene diaminetetraacetic acid (EDTA) and sodium salts thereof and trisodium nitrilotriacetate (NTA). Examples of suitable polyphosphates include tetrasodium pyrophosphate (TSPP), tetrapotassium pyrophosphate (TKPP), sodium hexametaphosphate (SHMP), potassium hexametaphosphate (KHMP), sodium hypophosphate (SHP), potassium hypophosphate (KHP), sodium tripolyphosphate (STPP), and potassium tripolyphosphate (KTPP). Examples of suitable phenols include phenol, hydroxytoluenes, and p-methoxyphenol (also known as hydroquinone monomethyl ether or MEHQ).

The composition may be pigmented or non-pigmented. A preferred pigmented coating contains $TiO_2$. The polymer particles may also include structural units of other monomers, particularly a post-crosslinking monomer (that is, a monomer that causes significant crosslinking after onset of film formation of the composition when applied to a substrate).

Examples of suitable post-crosslinking monomers include acetoacetoxyethyl methacrylate (AAEM) and diacetone acrylamide (DAM).

Additionally, the composition advantageously further includes one or more of the following materials: rheology modifiers; opaque polymers; fillers; colorants; pigments, including encapsulated or partially encapsulated pigments; dispersants; wetting aids; dispersing aids; anti-oxidants; dispersant adjuvants; chelating agents; surfactants; co-solvents; additional coalescing agents and plasticizers; defoamers; preservatives; anti-mar additives; flow agents; leveling agents; slip additives; and neutralizing agents.

Coatings with suitable hardness can be prepared from the composition of the present invention without the use of a high VOC coalescent.

Examples

Intermediate 1—Preparation of Hydroxypropyl Sorbate

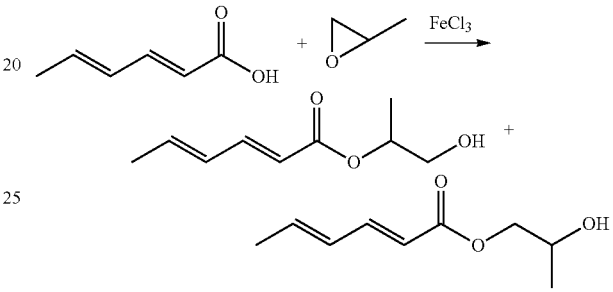

A reactor equipped with a stirrer and a cooling condenser was charged with sorbic acid (45.0 g), xylene (150.0 g), $FeCl_3$ (0.65 g) and phenothiazine (0.04 g). After a nitrogen purge, the mixture was heated with stirring to 75° C., at which time liquid propylene oxide (24.4 g) was added at 2 mL/min. The obtained liquid product was cooled to 45° C. An aqueous solution containing about 10% NaCl and 7% of $Na_2CO_3$ was added to the product with stirring for 30 min, after which time the xylene phase was passed through a filter to remove trace amounts of dispersed solids; the solvent was removed in vacuo to obtain propylene glycol monosorbate (a mixture of 2-hydroxypropyl sorbate and 2-hydroxy-1-methylethyl sorbate, 64.3 g).

Intermediate 2—Preparation of Triethylene Glycol Disorbate

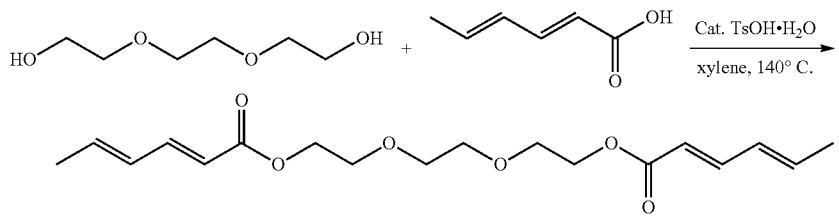

Sorbic acid (98.56 g), triethylene glycol (135.36 g), p-toluenesulfonic acid (TsOH) (2.00 g), and butylated hydroxytoluene (BHT) (1 g) were dissolved in xylene (200 mL). This resulting mixture was allowed to react at 140° C. (oil bath) using a Dean-Stark apparatus. After 7 h, the contest of the reactor were cooled to room temperature and neutralized by washing through an aqueous solution containing 10% of NaCl and 7% of $Na_2CO_3$. The suspense was further filtrated through celite and dried over $Na_2SO_4$. The product was filtrated and evaporated to afford a colorless oil (122.5 g).

Intermediate 3—Preparation of TMPD-Sorbate

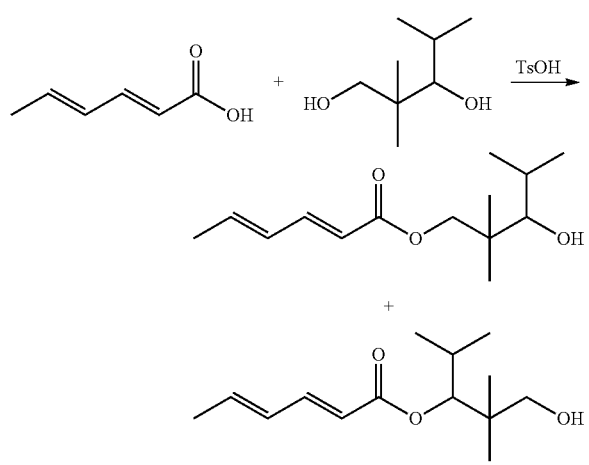

Sorbic acid (44.8 g), 2,2,4-trimethylpentane-1,3-diol (73 g), p-toluenesulfonic acid (1.5 g), and butylated hydroxytoluene (0.4 g) were dissolved in xylene (200 mL). This resulting mixture was allowed to react at 140° C. using a Dean-Stark apparatus. After 24 h, the contents of the reactor were cooled to room temperature and neutralized using a Monosphere 550 A (OH) resin column; and the suspension was further filtrated through celite and dried over $Na_2SO_4$. The product was filtrated and evaporated to afford a colorless oil (46.2 g).

The Master Gloss Formulation is set forth in Table 1. Example 1 is the paint formulation using Intermediate 1; Examples 2 and 3 and Comparative Example 1 used the identical formulation except that Intermediate 2 (37.8 g) was used to prepare Example 2, Intermediate 3 (37.8 g) was used to prepare Example 3, and sorbic acid (37.8 g) was used to prepare the Comparative Example.

TABLE 1

Master Gloss paint formulation

| Stage | Materials | Wt (g) |
|---|---|---|
| Grind | TiPure R-746 $TiO_2$ | 452.8 |
| | Water | 30 |
| | Byk-024 Defoamer | 3 |
| | TRITON ™ X-100 Surfactant | 6.6 |
| | TAMOL ™ 2002 Dispersant | 3 |
| | ACRYSOL ™ RM-2020 NPR Thickener | 30 |
| | Grind Sub-total | 644.41 |
| Let-down | RHOPLEX ™ HG-95P Emulsion Polymer | 882.7 |
| | Byk-024 Defoamer | 1.5 |
| | Ammonia (28%) | 0.38 |
| | Intermediate 1 | 37.8 |
| | ACRYSOL ™ RM-2020 NPR Thickener | 35.8 |
| | ACRYSOL ™ RM-8W Thickener | 2.67 |
| | Water | 137.06 |
| | Total | 4162.2 |

TRITON, TAMOL, RHOPLEX, and ACRYSOL are all Trademarks of The Dow Chemical Company or its Affiliates. The HG-95P emulsion polymer contains ~8 weight percent structural units of AAEM.

Drawdowns of the paints (10 mil wet on aluminum panels, 25 g base paint with 0.85 g coalescent) were prepared for König testing. All drawdowns were stored in the controlled temperature room until use. König testing was done using the TQC Pendulum Hardness Tester SP0500. Each König value reported is the average of three measurements. Table 2 illustrates König hardness and LTFF (Low Temperature Film Formation at 4.5° C.) rating for the three formulation examples (Ex. 1, Ex. 2, Ex. 3) and the Comparative Example formulation (Comp. Ex.), which contains sorbic acid.

TABLE 2

Hardness comparison Formulation I HG-95

| Paint ID | Ex. 1 | Ex. 2 | Ex. 3 | Comp. Ex. |
|---|---|---|---|---|
| Coalescent Type Boiling point | Int. 1 | Int. 2 | Int. 3 | Sorbic Acid |
| König Hardness @ 28 d (s) | 44 | 16 | 34 | 55 |
| LTFF rating (1-10) | 10 | 10 | 10 | 1 |

The formulations containing the sorbate ester coalescents showed adequate König hardness, even when compared to Texanol, which has a boiling point of 254° C., as well as a top rating for LTFF. The formulation using sorbic acid, although showing adequate König Hardness, showed no coalescence of the film at 4.5° C. and 40% relative humidity, as indicated by the lowest LTFF rating. The results demonstrate the remarkable and surprising difference in the film-forming enhancement of coatings formulations imparted by sorbate esters as compared to sorbic acid. The results further demonstrate that sorbic acid is not functioning as a coalescent.

Determination of Imbibing of Coalescent into the Latex Particle

Imbibing of the coalescent into the latex particles was confirmed by proton NMR spectroscopy. In a first experiment, the latex containing the coalescent was placed as is in an NMR tube and resonances associated with the coalescent were monitored in the aqueous phase of the of the emulsion latex. Under this condition, signals from the aqueous phase were the only ones detected because the molecules in the latex particles are partly immobilized, leading to extremely broad signals that are not detected within the spectral width for aqueous phase materials. The spectra revealed only slight traces of the coalescent (<1% by weight) in the aqueous phase. In contrast, sorbic acid was detected quantitatively or nearly quantitatively in the aqueous phase, which demonstrates that it does not partition into the latex particles.

In a second independent NMR spectroscopic test to demonstrate imbibing of the coalescent, a broadline proton resonance was monitored for molecules in the latex particles by varying the concentration of the coalescent in the latex from 0 to 16% weight, based on the weight of the latex. As the amount of the coalescent was increased, the linewidth narrowed linearly, which corresponded to a reduction of the $T_g$ of the polymer or an increase in the polymer dynamics of the polymers in the particles due to the increase in the coalescent concentration. The narrowing of linewidth of the resonances associated with the polymer in the particles also directly correlated with minimum film formation of the films arising from these emulsions.

Minimum Film Formation Temperature (MFFT)

The minimum film formation temperature (MFFT) of a latex is the lowest temperature at which the latex forms a practical film. MFFT is typically measured using ASTM standard D2354-10. In this test method, the MFFT is determined by visual observation of cracking or whitening in films that have dried over a substrate having a controlled temperature gradient. In addition to the visual MFFT, a mechanical MFFT can also be determined by locating the minimum temperature at which the latex formed a film with some mechanical strength.

To determine the coalescent efficiency, that is, the ability to lower MFFT of different molecules, the MFFT is measured determined at various coalescent levels. Typically reported in ΔMFFT (° C.)/coalescent level (weight % coalescent based on solid polymer), the ΔMFFT is a direct measurement of the coalescent efficiency. Table 3 shows the visual MFFT of RHOPLEX HG-95P Binder with different coalescents at various levels. The percent coalescent level is based on binder solids. Similar behavior was observed for the mechanical MFFT.

For a molecule to behave as an effective coalescent, it must lower the $T_g$ of the latex it is blended with. The coalescent must be compatible with the latex of interest and have a lower $T_g$ than the latex itself. For a given type of molecule, compatibility (or solubility) will generally decrease with increasing molecular weight due to entropic effects.

TABLE 3

Visual MFFT Data
Visual Minimum Film Formation Temperature (° C.)

| Example No. | Sorbate Ester Level (% based on binder solids) | | |
|---|---|---|---|
| | 4% | 8% | 12% |
| Example 1 MFFT (° C.) | 9.8 | 4.0 | <0 |
| Example 2 MFFT (° C.) | 15.3 | 8.3 | 3.5 |
| Example 3 MFFT (° C.) | 14.7 | 8.5 | 4.9 |

MFFT data for the comparative sorbic acid was not obtainable because of poor colloidal stability of the latex and the sorbic acid.

Table 3 shows that MFFT decreases for each formulation with increasing sorbate level concentration. At 12% levels, the MFFT is less than 5° C. in each case, which is of particular interest to formulators who require that their formulations pass such a test.

Remediation of Yellowing

Chemical mediators were added to Example 1 paint formulations and CIE Lab values were measured using a spectroscopic colorimeter (BYK-Gardner color-guide 45°/0°) and compared to the Example 1 paint formulation without mediator. The measurements were made on dry films that had been stored in a constant temperature and humidity room (76° F./50% RH). The films were initially cast using a 7-mil drawdown bar on white lenta charts. The data showing the effect of the addition of the chemical mediators are illustrated in Table 4. The more negative the Δb*, the better the remediation.

TABLE 4

Effect of Mediator on Remediation of Yellowing

| Mediator | Amount (ppm) | 28 day Δb* (relative to Ex. 1 w/o Mediator) |
|---|---|---|
| 4-Hydroxy TEMPO | 250 | −3.17 |
| 4-Acetamido TEMPO | 1000 | −2.80 |
| MEHQ | 500 | −2.55 |
| TEMPO | 3000 | −2.52 |
| PETMP | 3000 | −2.33 |
| NTA | 3000 | −1.06 |
| EDTA | 3000 | −1.03 |

TABLE 4-continued

Effect of Mediator on Remediation of Yellowing

| Mediator | Amount (ppm) | 28 day Δb* (relative to Ex. 1 w/o Mediator) |
|---|---|---|
| SHP | 1000 | −0.98 |
| SHMP | 3000 | −0.67 |

The data suggest that a wide variety of chemical mediators are effective in reducing yellowing in paint formulations and that 4-hydroxy TEMPO is especially effective at low levels.

The invention claimed is:

1. A composition comprising a stable aqueous dispersion of polymer particles, from 0.5 to 35 weight percent of a sorbate ester or sorbamide coalescent, based on the weight of the polymer particles, and from 10 ppm to 1 weight percent of a radical mediator, based on the weight of the composition, wherein the coalescent is imbibed in the polymer particles, wherein at least 60% of the coalescent is incorporated into the polymer particles; and wherein radical mediator is a hindered amine, a hindered N-oxide, a thiol, an amino polycarboxylic acid or a salt thereof, a polyphosphate, or a phenol, or a combination thereof.

2. The composition of claim 1 wherein the coalescent is characterized by the following formula:

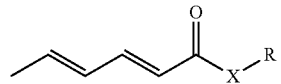

where R is a $C_1$-$C_{20}$ linear or branched alkyl group optionally functionalized with ether, thioether, amine, hydroxyl, ester, phenyl, alkyenyl groups, or combinations thereof; C(O)X is an ester group or an amide group; and the coalescent is a liquid at 20° C.

3. The composition of claim 2 wherein R is —(CH$_2$—CH(R$^1$)—O)$_n$—R$^2$, —CH(R$^1$)—CH$_2$—O—R$^2$, or linear or branched —R$^3$—OR$^2$;
where R$^1$ is H, C$_1$-C$_6$-alkyl, —CH$_2$OH, or phenyl;
R$^2$ is H, C$_1$-C$_6$-alkyl, benzyl, or CH$_3$CH═CH—CH═CH—C(O)—; allyl; —C(O)—CR$^4$═CH$_2$;
R$^3$ is a bivalent C$_4$-C$_{10}$-linear or branched alkyl or hydroxyalkyl group;
R$^4$ is H or CH$_3$;
X is O or NR$^5$, where R$^5$ is H or C$_1$-C$_6$-alkyl; and
n is 1 to 7;
wherein the concentration of the coalescent is from 1 to 20 weight percent, based on the weight of the polymer particles and the coalescent.

4. The composition of claim 1 which contains from 20 ppm to 0.5 weight percent of the radical mediator, based on the weight of the composition, wherein the coalescent is a sorbate ester having a molecular weight from 126 g/mol to 500 g/mol, wherein the radical mediator is a hindered N-oxide, a phenol, or a thiol.

5. The composition of claim 4 wherein the radical mediator is 4-acetamido-2,2,6,6-tetramethylpiperidine-1-oxyl or 4-hydroxy-2,2,6,6-tetramethylpiperidine-1-oxyl.

6. The composition of claim 4 wherein the radical mediator is pentaerythritol tetrakis(3-mercaptoproprionate).

7. The composition of claim 4 wherein the radical mediator is p-methoxyphenol.

8. The composition of claim 2 wherein the coalescent is selected from the group consisting of:

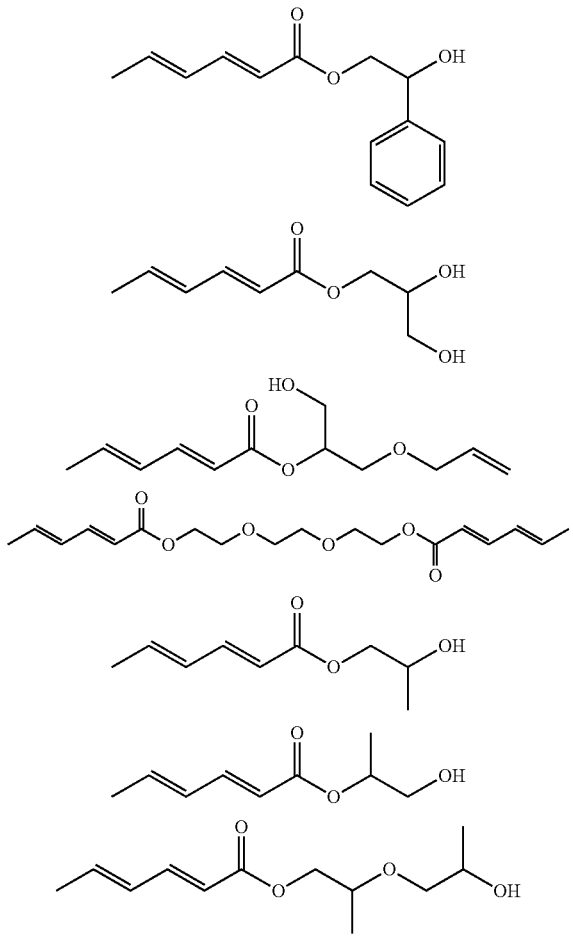

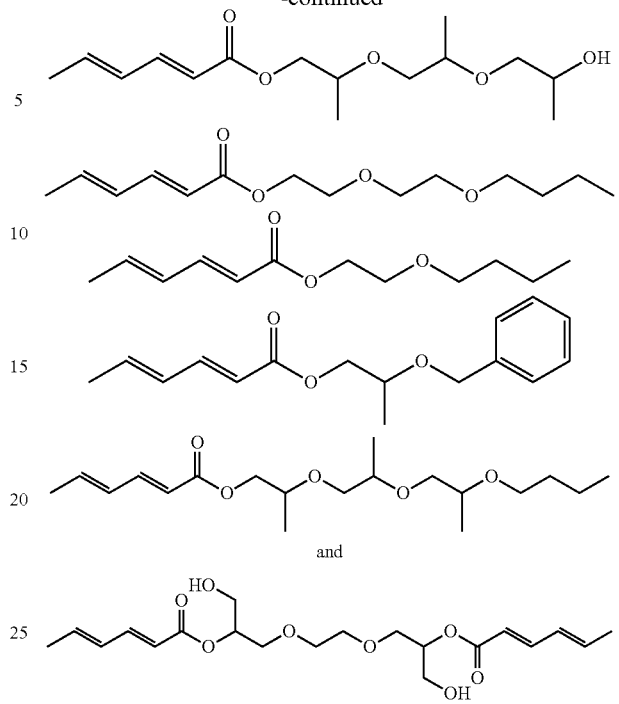

wherein the coalescent is at least 90% imbibed into the polymer particles.

9. The composition of claim 1 which is non-pigmented.

10. The composition of claim 1 which further includes one or more materials selected from the group consisting of rheology modifiers; opaque polymers; fillers; colorants; pigments, dispersants; wetting aids; dispersing aids; dispersant adjuvants; chelating agents; surfactants; co-solvents; additional coalescing agents; defoamers; preservatives; anti-mar additives; flow agents; leveling agents; slip additives; and neutralizing agents.

* * * * *